United States Patent [19]

Boman

[11] 3,945,789

[45] Mar. 23, 1976

[54] DUAL-BELT PRESS

[75] Inventor: Karl Gunnar Boman, Neckarrems, Germany

[73] Assignee: Sandco Limited, Ottawa, Canada

[22] Filed: Apr. 22, 1975

[21] Appl. No.: 570,399

[30] Foreign Application Priority Data

Apr. 24, 1974 Germany ............................ 2419706

[52] U.S. Cl. ................................................ 425/371

[51] Int. Cl.$^{2}$.... B29J 5/04; B29J 5/08; B29C 15/00

[58] Field of Search..................... 425/363, 371, 372

[56] References Cited

UNITED STATES PATENTS

| | | | |
|---|---|---|---|
| 2,881,715 | 4/1959 | Heim | 425/372 |
| 2,975,470 | 3/1961 | Snelson et al. | 425/371 X |
| 3,138,120 | 6/1964 | Balmer et al. | 425/371 |
| 3,193,888 | 7/1965 | Rochester | 425/371 X |
| 3,795,470 | 3/1974 | De Mets | 425/371 |
| 3,885,901 | 5/1975 | Reiners | 425/371 |

*Primary Examiner*—J. Howard Flint, Jr.
*Attorney, Agent, or Firm*—Harold L. Stults

[57] ABSTRACT

A duel-belt press in which two mating endless steel belts are supported and pressed against each other through a treating zone while holding a layer of a product captive. The layer of product is compressed as it moves into the nip formed by two diametrically opposed compression rolls which act through the belts to compress the product layer. Belt support structures are provided through the zone extending from upstream to downstream of the compression rollers relative to the movement of the belts and the layer of the product.

12 Claims, 5 Drawing Figures

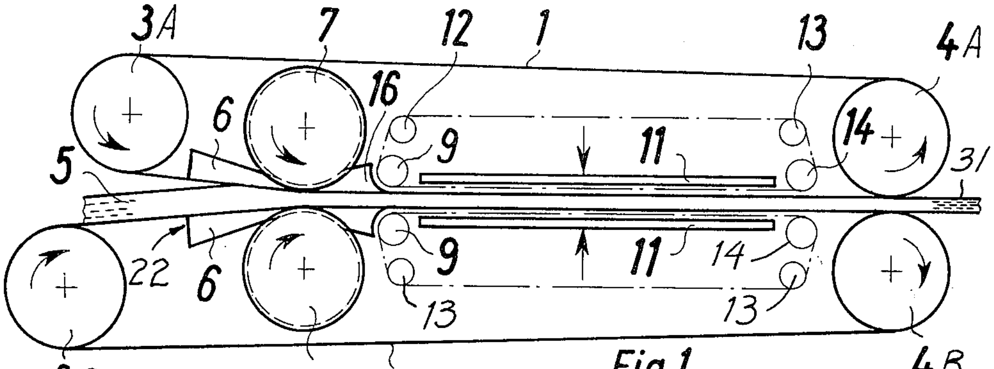
Fig.1
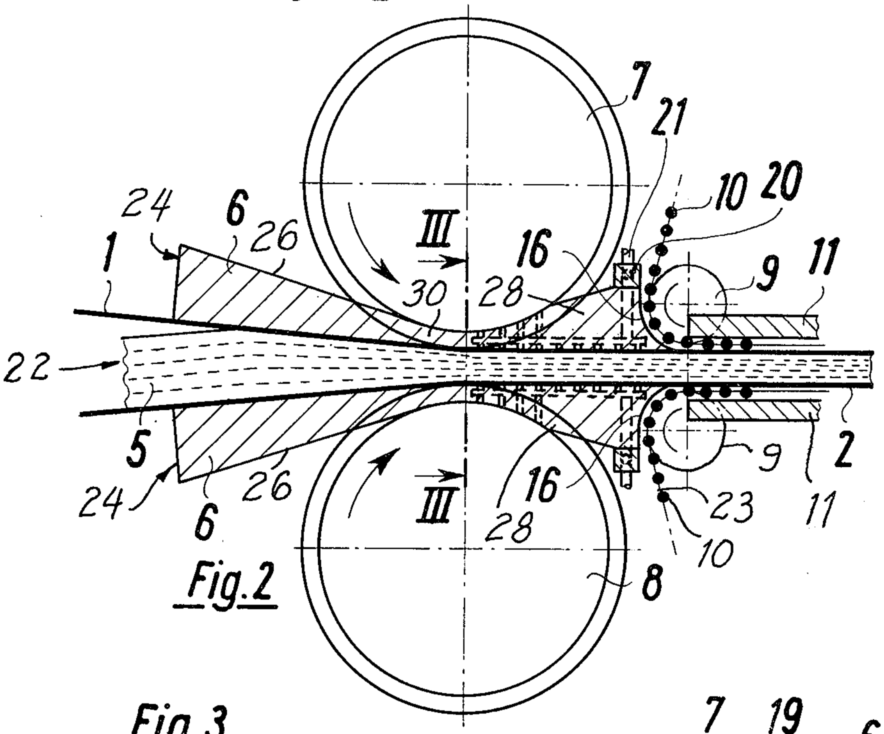
Fig.2
Fig.3
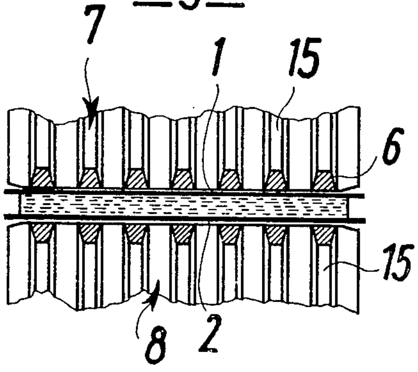
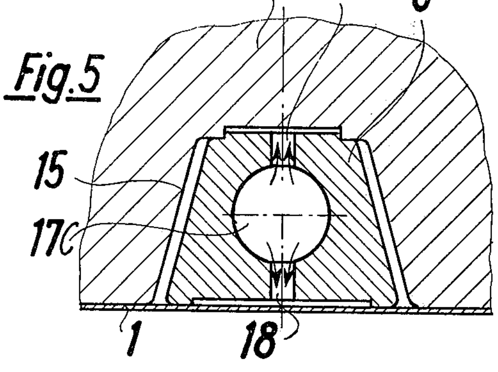
Fig.5

DUAL-BELT PRESS

This invention relates to endless belt presses, and, more in particular to duel-belt presses in which two mating endless metal belts are supported upon rolls or drums and having mating runs between which a layer of a product is fed and is compressed by a pair of diametrically positioned compression rolls.

The present invention is particularly important for use in duel-belt presses of the type which may be used for compacting products, German Pat. No. 923,172 discloses a press of that type. It is an object of the present invention to adapt endless belt presses for compacting materials to a final shape under high pressure, for example, for manufacturing particle board. The materials used for producing that product are considerably bulkier than the finished product so that a layer for forming a sheet of particle board is much thicker than the compacted material in its final condition. Accordingly, the layer of material must be compressed a very substantial amount. In order to utilize endless belts for performing the compressing operation at the zone where the product enters, the belts must be supported upon pulleys which are spaced a substantial distance apart, and there are compression rolls which act through the belts to compress the layer of material to the desired thickness. Within the area of the compression rolls, the belts are subjected to very substantial pressures.

It is an object of the present invention to provide endless belt presses, and particularly duel-belt presses which operate at high compacting pressures, to produce substantial reductions in the thickness of the materials being processed in them. It is a further object to provide improved systems and methods for compacting materials. It is a further object to provide endless steel belt systems in which a belt can be used to impose substantial compression forces upon products without creating objectionable stressing and flexing of the belt. These and other objects will be in part obvious and in part pointed out below.

IN THE DRAWINGS

FIG. 1 is a diagrammatic side elevation of a duel-belt press incorporating the invention;

FIG. 2 is an enlarged view, partially in section and somewhat schematic, of the portion of FIG. 1 in which the layer of the product being treated is subjected to substantial compacting;

FIG. 3 is a fragmentary sectional view on the line III—III of FIG. 2;

Figure 4:
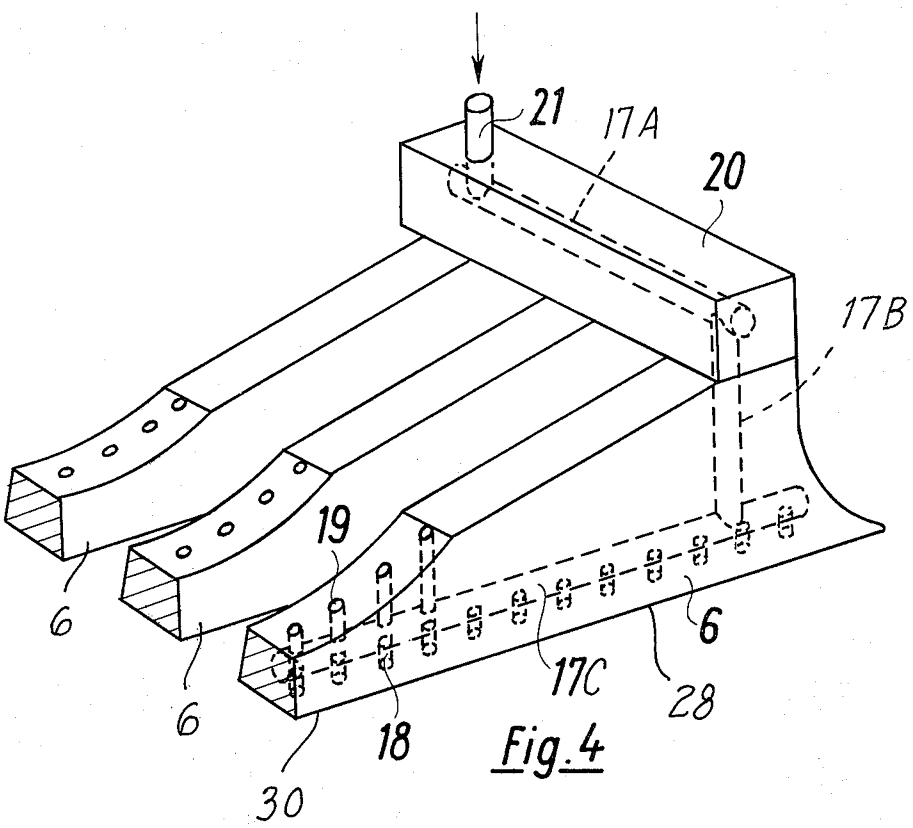
FIG. 4 is a somewhat schematic and enlarged perspective view of a portion of a belt supporting structure of FIGS. 1 and 2; and, FIG. 5 is an enlarged vertical section showing the relationship between the strip shown at the lower left hand portion of FIG. 4 and one of the compression rolls of FIGS. 1–3.

Referring to FIG. 1 of the drawings, a pair of endless steel belts 1 and 2 are mounted upon end pulleys 3A and 3B at the left and pulleys 4A and 4B at the right. Pulleys 4A and 4B are positioned diametrically opposite to each other with a distance between the belts passing around them being equal to the thickness desired in the finished product layer 21. A layer 5 of a product to be compacted is fed onto belt 2 at the left and is carried to the right into a compression zone 22 formed by a pair of diametrically opposed compression rollers 7 and 8 past which belts 1 and 2 move and which provide the compression forces which reduce the thickness of layer 5 to the precise thickness desired in the finished product. However, pulleys 3A and 3B are spaced from each other at an appreciably greater distance so that the mating runs of the belts move toward each other when passing from pulleys 3A and 3B to the compression rollers 7 and 8. That provides the compression zone 22 within which the product layer 5 is contacted by belt 1 and is then compressed between the belts as it moves into the nip between rollers 7 and 8 (see also FIG. 2). After passing the compression rollers, the product is held in its compacted position and moves on to the right past a pair of rollers 9A and 9B, each of which guides the rollers 10 of a roller assembly in between its belt and a pressure plate 11. Rollers 10 are of small diameter and are held in closely spaced parallel relationship by a pair of endless chains 23 positioned at the opposite ends of the rollers, extending along the continuous path at the ends of the rollers with each roller end being pivoted to its chain. Hence, as each roller 10 moves around its roller 9, it moves between its belt and its pressure plate 11 and the movement of the belt causes the roller 10 to roll along the surface of the adjacent plate 11. As shown in FIG. 1, each of the roller assemblies formed by rollers 10 passes from beneath its plate 11 at the right and around a closed path formed by three rollers 14, 13 and 12 while passing through the zone between pressure plates 11. The product layer is cured and stabilized to form the rigid layer 31.

Throughout the compression zone upstream with respect to the belt movement from compression rollers 7 and 8 to the right in FIGS. 1 and 2 to rollers 9A and 9B, each of the belts is provided with a compression shoe 24 formed by a plurality of parallel metal strips 6 (see also FIG. 4) which have main compression portions 26 within the compression zone upstream from the compression rollers, compression portions 28 within the zone between compression rollers 7 and 8 and rollers 9A and 9B, and each strip 6 also has an integral central connection portion 30 which extends between its compression roller 7 and 8 and its belt. Each of the compression rollers has a peripheral groove 15 (see FIG. 5) for each of its strips 6. That is, in the illustrative embodiment (see FIG. 3) there are seven strips 6 forming each shoe 24 and there are seven equally spaced grooves 15 in which the portions 30 of the strips are positioned as shown in FIGS. 3 and 5. The strips 6 of each shoe are interconnected at the left by a top strip 20 and form comblike structure. However, each strip 6 has a continuous flat surface which is held tightly against its belt and the strips mate with grooves 15 so that the shoe is retained in its proper operating position by its compression roller. The end of each shoe adjacent its rollers 10 is shaped to the contour of the outer edge of the path of rollers 10 so that the shoe extends between the belt and a substantial portion of the roller 9A or 9B. It is thus seen that each of the shoes provides a continuous supporting surface on each of its strips 6 against which the belt rests throughout the entire compression zone and up to the zone where rollers 10 engage the belt. Within that zone the product layer 5 is compacted and is held in compressed condition for sufficient time for its thickness to be stabilized. However, rollers 10 then maintain the compression throughout the treatment zone along compression plates 11.

Referring to FIGS. 2 and 4, each of the shoes is provided with an inlet pipe 21 for compressed air which acts as a lubricating or friction reducing medium throughout the zone downstream from the center line of the compression rollers in the direction of the belt movement. Accordingly, each shoe has air distribution passageways 17; horizontal passageway 17A; a vertical passageway 17B extending downwardly into each strip 6; a horizontal passageway 17C extending longitudinally in the strip; vertical discharge passageways 18 opening to the adjacent belt (see also FIG. 5); and vertical discharge passageways 19 opening into the top (or bottom) of the groove 15 in the compression roller. As shown in FIG. 5, grooves 15 and strips 6 have parallel or mating surfaces and are tapered. There are also spaces at the top and bottom of the strip for the discharge of the compressed air. The air pressure is sufficient to provide substantial support from the compression roller to the strip and from the strip to the belt, and to provide lubrication or friction reducing or act as a friction reducing fluid.

It is thus seen that the compressed air provides a lubricating function between the shoes and the compression rollers and between the shoes and the belt. The shoes are held from moving from their operating positions by the engagement with the compression rollers. The compacting or compression rollers 7 and 8 are located in the area where the maximum compacting pressure is required. By reason of their dimensions, those rollers are able to absorb elevated pressures and are structurally adapted to the particular requirements. Owing to their combination with the supporting strips 6, it is possible to control the operating conditions in the area where the maximum pressure is encountered, which in the embodiment shown calls for a pressure ranging from 25 to 30 kp/cm$^2$ (i.e., 234 Kg to 294 Kg) over a length of about 10 cm, in such a way that the requisite pressure is produced over that length. An advantage of this embodiment is that supporting strips 6 prevent the moving steel belts from being subjected to excessive bending stresses in the jawlike opening between the end pulleys 3A and 3B. The belts are also protected against deformation, particularly in the area where the maximum pressure is produced by rollers 7 and 8 and the adjacent portions of the supporting strips 6. The diametrically opposed positioning of rollers 7 and 8 insure that the pressures are exerted on the material to be compressed, rather than acting upon the steel belts as bending forces. Since the pressure gradually decreases in the area between the point of contact between the belts 1 and 2 and the compacting rolls 7 and 8 and the deflection rollers 9A and 9B, the pressures there still prevailing can readily be absorbed by the pressure rollers.

What is claimed is:

1. A dual-belt press in which two endless metal belts or the like are provided which on their facing sides are supported and pressed against each other by rollerlike pressure bodies, said belts being spread apart and forming an inlet area for compressing material masses, characterized by including a pair of compression rollers which form a compacting zone along said inlet area and which are diametrically opposed in the vicinity of the narrowest point of said inlet area between said belts, and supporting shoes which bear against the belts and bridge the space along said compacting zone and between the line of contact of said belt and said compacting roll and between the belt and the rollerlike pressure bodies.

2. A dual-belt press as defined in claim 1, characterized by the fact that said supporting shoes include interconnected portions disposed along said belt upstream and downstream of said compression rollers with respect to the direction of belt travel.

3. A dual-belt press as defined in claim 2, characterized by the fact that said supporting shoes have surfaces adjacent and along the path of the periphery of said compacting rolls.

4. A duel-belt press as defined in claim 3, characterized by the fact that said supporting shoes have end faces which are positioned along the path of the deflection of the pressure rollers.

5. A dual-belt press as defined in claim 2, wherein said compression rollers have peripheral grooves and said supporting shoes are constructed as a plurality of supporting strips between said compression roller and the belt which mesh with and are positioned respectively in said pheripheral grooves.

6. A dual-belt press as defined in claim 5, characterized by the fact that the sides of said supporting shoes facing said pressure rollers extend into the wedge zone between said belt and said pressure rollers moving toward said belt.

7. A dual-belt press as defined in claim 6, characterized by the fact that said supporting shoes are provided with through ducts and with openings on the side facing the belt through which a friction-reducing medium is discharged.

8. A dual-belt press as defined in claim 7, which includes outlet openings on the side of the supporting shoes which faces said compression roller.

9. A dual-belt press as defined in claim 8, characterized by the fact that the friction-reducing medium is compressed air.

10. A dual-belt press as defined in claim 9, characterized by the fact that the supporting strips are interconnected at one end in comblike fashion by a connecting member which is provided with a pipe connection for admission of said compressed air.

11. In an endless belt press having a treatment zone through which a layer of compacted material is passed between the mating runs of two endless belts, the combination of, a pair of compression rollers which are diametrically positioned upon the opposite sides of said runs so as to provide a zone of maximum compression for the material passing to said treatment zone, means mounting said belts at the discharge end of said treatment zone spaced from each other to provide a discharge opening of substantially the dimension of the treated product, means mounting said belts at their other ends with the belts spaced from each other to provide an inlet zone in which the belts move toward each other into a compression zone and approach said compression rollers, and support structure within said compression zone which provide support surfaces against which said belts are urged by the material being compacted.

12. Apparatus as described in claim 11 wherein said support structure comprises shoes which extend in the direction of belt movement beyond said zone of maximum compression and which includes structure extending between said compression rollers and each having a contour away from said belts to provide an interlocking relationship between said shoe structure and the adjacent compression roller.

* * * * *